United States Patent [19]
Choi

[11] Patent Number: 5,473,371
[45] Date of Patent: Dec. 5, 1995

[54] WINDOW GENERATING APPARATUS FOR USE IN A VIDEO CAMERA

[75] Inventor: Byung-Bong Choi, Incheon, Rep. of Korea

[73] Assignee: Daewoo Electronics Co., Ltd., Seoul, Rep. of Korea

[21] Appl. No.: 264,407

[22] Filed: Jun. 23, 1994

[30] Foreign Application Priority Data

Jun. 23, 1993 [KR] Rep. of Korea .................. 1993-11543

[51] Int. Cl.[6] .................................................. H04N 5/262
[52] U.S. Cl. ............................................. 348/239; 348/596
[58] Field of Search .................................. 348/239, 580, 348/596, 25, 26, 30, 511; 345/118; 358/183; H04N 9/74, 5/262

[56] References Cited

U.S. PATENT DOCUMENTS

| | | | |
|---|---|---|---|
| 4,566,126 | 1/1986 | Miyagawa | 348/596 |
| 4,814,884 | 3/1989 | Johnson | 348/596 |
| 4,953,027 | 8/1990 | Tong | 348/596 |

*Primary Examiner*—James J. Groody
*Assistant Examiner*—Sherrie Hsia
*Attorney, Agent, or Firm*—Anderson Kill Olick & Oshinsky

[57] ABSTRACT

A picture editing apparatus for use in a video camera that generates a video signal for a picture with successive video lines is capable of providing a window and a blank area within the picture. The apparatus comprises a selection button for generating a signal to select a vertical length and a horizontal width of the window; a synchronization signal generator for generating synchronization signals; a control unit, in response to the selection signal, for processing the synchronization signals to generate a window signal; a window generator, in response to the window signal, for processing the video signal to derive the window and the blank area.

5 Claims, 5 Drawing Sheets

5,473,371

WINDOW GENERATING APPARATUS FOR USE IN A VIDEO CAMERA

FIELD OF THE INVENTION

The present invention relates to an editing apparatus for use in a video camera; and, more particularly, to a picture editing apparatus for use in a video camera for producing a window and a blank area within a picture.

DESCRIPTION OF THE PRIOR ART

As well known, video cameras carry a small screen TV monitor through which all four edges of a picture can be seen by the camera operator, referred to as a viewfinder, and a recording unit. The viewfinder is driven directly from the video output of the video camera, which permits the operator to see what the camera sees for the purpose of target framing and optical focus adjustment.

With the increasingly wide use of video cameras, there have been need felt to have a device provided in the camera which would allow the operation to edit the picture to be recorded in the recording unit is edited, i.e., edge portions of the picture are covered or moved for the purpose of accentuating a particular area within the picture and the covered area is whitened or blackened as if viewing a moving picture through a picture frame. Such editing, however, is difficult to be performed since a high level of skill is required.

SUMMARY OF THE INVENTION

It is, therefore, an object of the invention to provide an apparatus for use in a video camera for editing a picture by providing a window for a particular area and a blank area within the picture.

It is another object of the invention to provide an apparatus for controlling the size of the window within the picture.

It is a further object of the invention to provide an apparatus for presenting the blank area in a white or a black makeup.

In accordance with the present invention, there is provided a picture editing apparatus capable of providing a window and a blank area within a picture for use in a video camera generating a video signal with successive video lines, which comprises a selection button for generating a selection signal to select a vertical length and a horizontal width of the window; a synchronization signal generator for generating synchronization signals; a control unit, in response to the selection signal, for processing the synchronization signals to generate a window signal; a window generator, in response to the window signal, for processing the video signal to derive the window and the blank area.

BRIEF DESCRIPTION OF THE DRAWINGS

The above and other objects and features of the present invention will become apparent from the following description of preferred embodiments taken in conjunction with the accompanying drawing, in which.

DETAILED DESCRIPTION OF THE PREFERRED EMBODIMENTS

Figure 1:
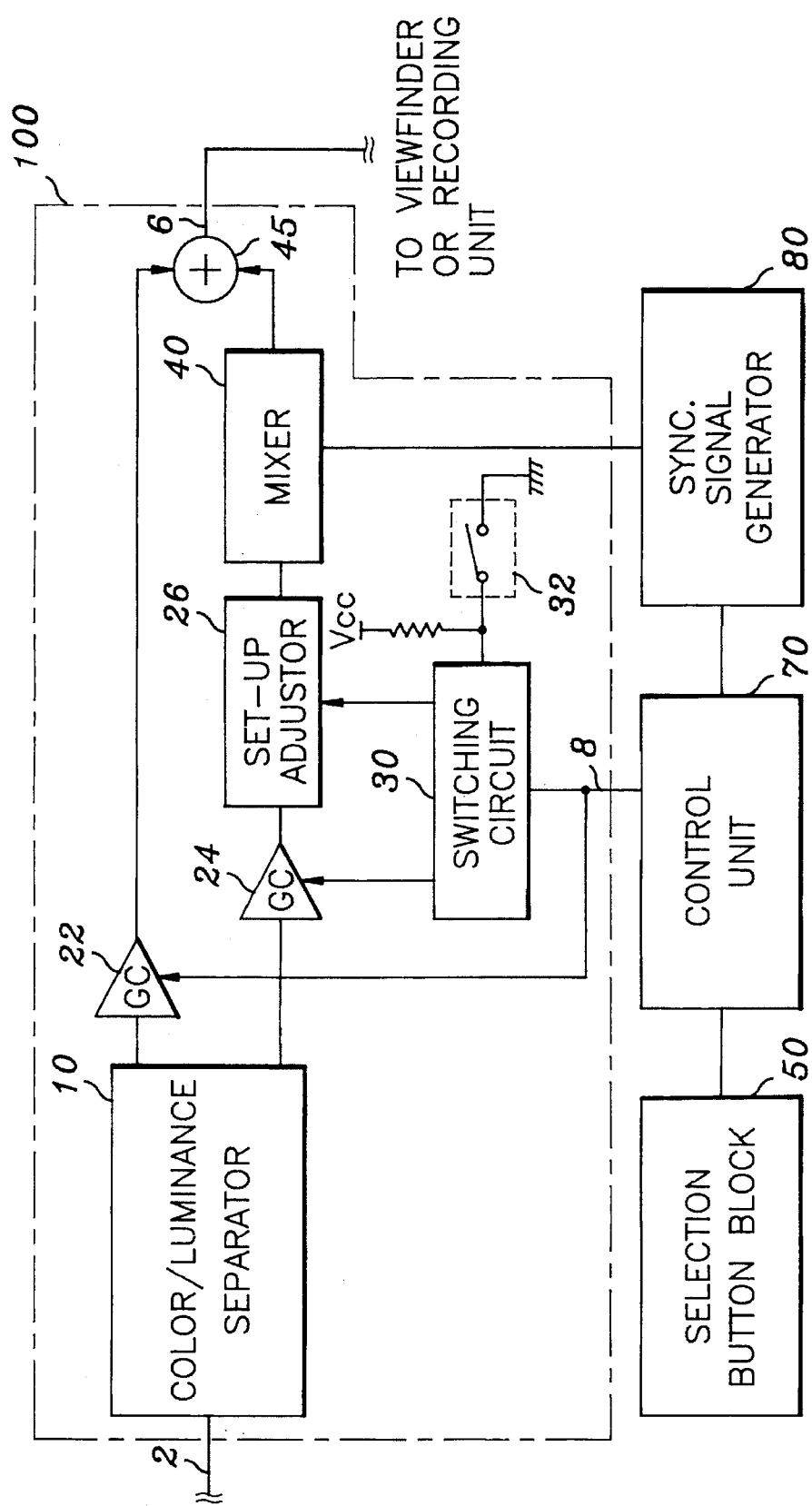
FIG. 1 is a schematic block diagram of an apparatus for editing a picture to be televised or recorded by way of producing a window and a blank area within the picture in accordance with the present invention.

Referring to FIG. 1, there is shown a block diagram of an apparatus for use in a video camera, having a viewfinder (not shown) and a recording unit (not shown), which is capable of editing a picture from the video camera in accordance with the present invention. In a video camera, a video signal is generated from a pick-up device, a CCD (charge coupled device) imager and an appropriate scanning device which scans an object projected on the pick-up device to produce successive video lines constituting the video signal.

The video signal is provided through line 2 to a window generator 100 for the processing thereof in accordance with the present invention. The resultant edited video signal from the editing apparatus is supplied through line 6 to the viewfinder for the viewing of the edited picture and the recording unit for recording the edited picture. For explanatory purpose, the picture to be seen through the viewfinder is exemplarily shown in FIG. 2. As depicted, the picture within the viewfinder has a particular area or window 33 with video information and a blank area 36 without any video information. The window 33 has a vertical length from a top position ("$H_{start}$") to a bottom position ("$H_{end}$") and a horizontal width from a left side position ("$T_{start}$") to a right side position ("$T_{end}$"). In accordance with the present invention, the vertical length may be determined by the number of video lines from the $H_{start}$ to the $H_{end}$. And the horizontal width may be determined by a running time taken to sweep a video line between the $T_{start}$ and the $T_{end}$. That is, when the time taken to generate a video line is divided into a plurality of time intervals, the running time corresponds to the number of the intervals between the $T_{start}$ to the $T_{end}$. The vertical length and the horizontal width are optionally selected by a selection button block 50.

Figure 3:
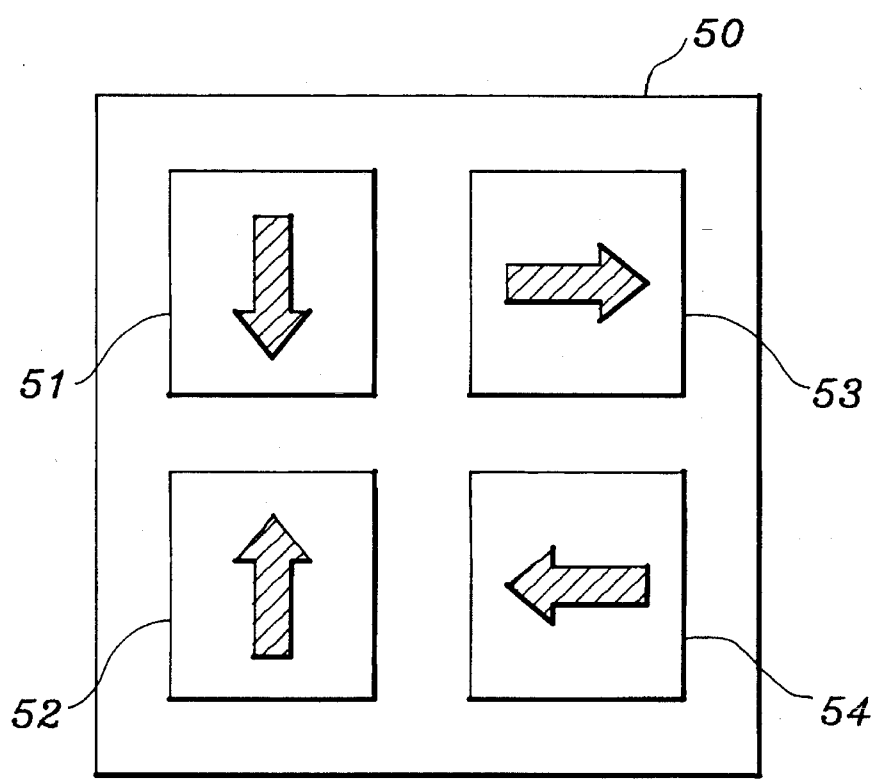
FIG. 3 illustrates the selection button block of FIG. 1 detail.

FIG. 3 shows the selection button block 50 which provides a selection signal to arbitrarily settle the size of the window. The selection button block 50 has a plurality of selection keys 51 to 55. The top position and bottom position selection buttons 51 and 52 are used to select the values of the $H_{start}$ and the $H_{end}$ from an upper end and a lower end of the picture by depressing the buttons 51 and 52 for a require number of times. The left side position and right side position selection buttons 53 and 54 are used to select the values of the $T_{start}$ and the $T_{end}$ from a left end and a right end of the picture by depressing the buttons 53 and 54 for a require number of times. In this connection, the $H_{end}$ and $T_{end}$ are calculated by subtracting the number of depression times of the buttons 52 and 54 from default values, respectively. For example, the default value for the $H_{start}$, in case of NTSC format, may be a value of "262" which corresponds to the number of video lines consisituting a half frame. Similarly, the default value for $T_{end}$ may be the number of pixels in a video line. Accordingly, each of time intervals may correspond to the number of the pixels. The selected values from the selection block 50 are provided to a control unit 70.

Figure 4:
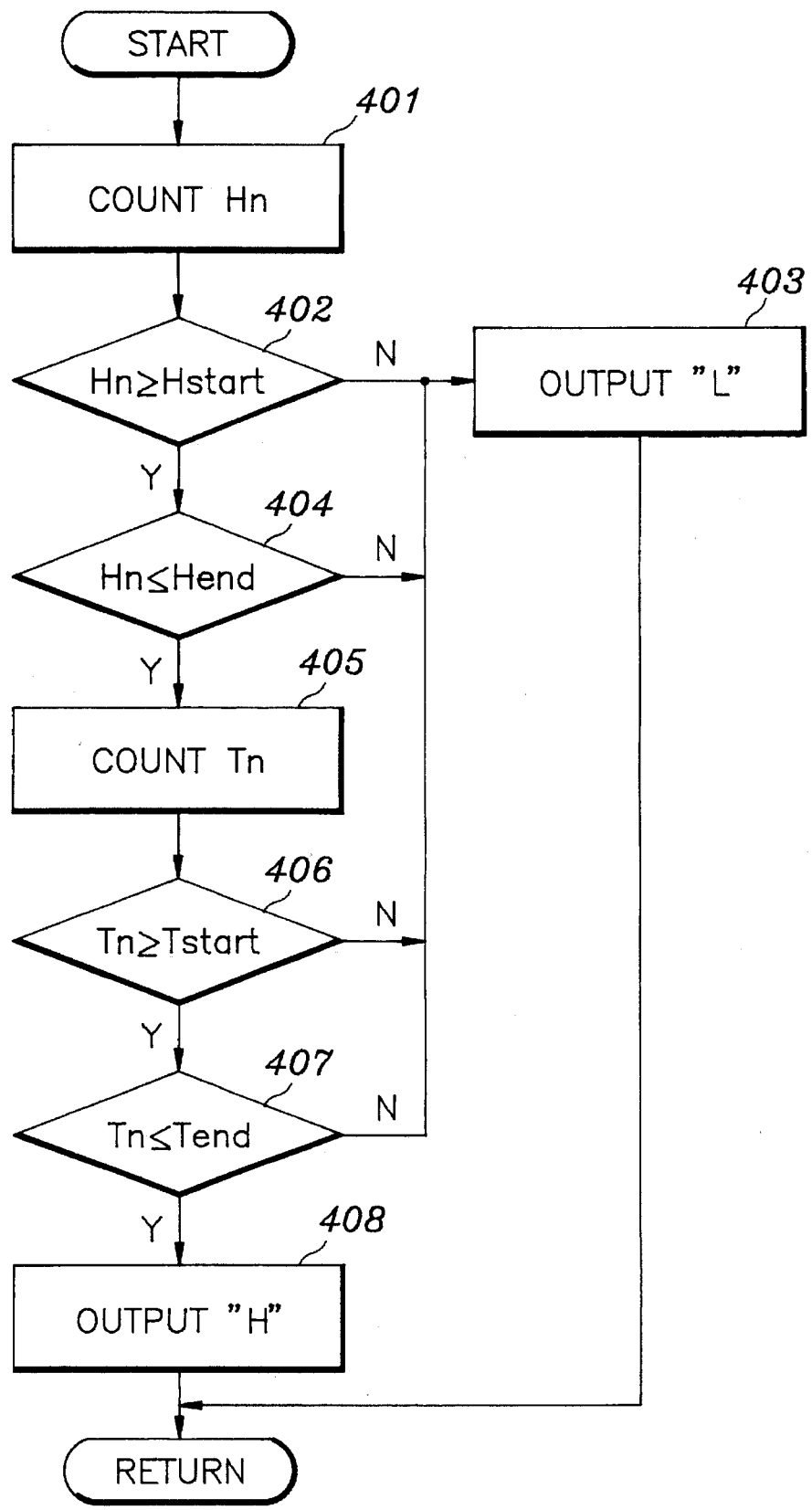
FIG. 4 represents a flow diagram explaining the operation the control unit shown in FIG. 1.

A synchronization ("sync") signal generator 80 generates horizontal and vertical sync signals and then supplies them to the control unit 70. The control unit 70, in response to the selection signal from the selection button block 50, derives a window signal from the sync signals, wherein the window signal is used to define the window and the blank area. The operation of the control unit 70 will now be described with reference to FIG. 4 as follows.

Figures 6A, 6B, 6C:
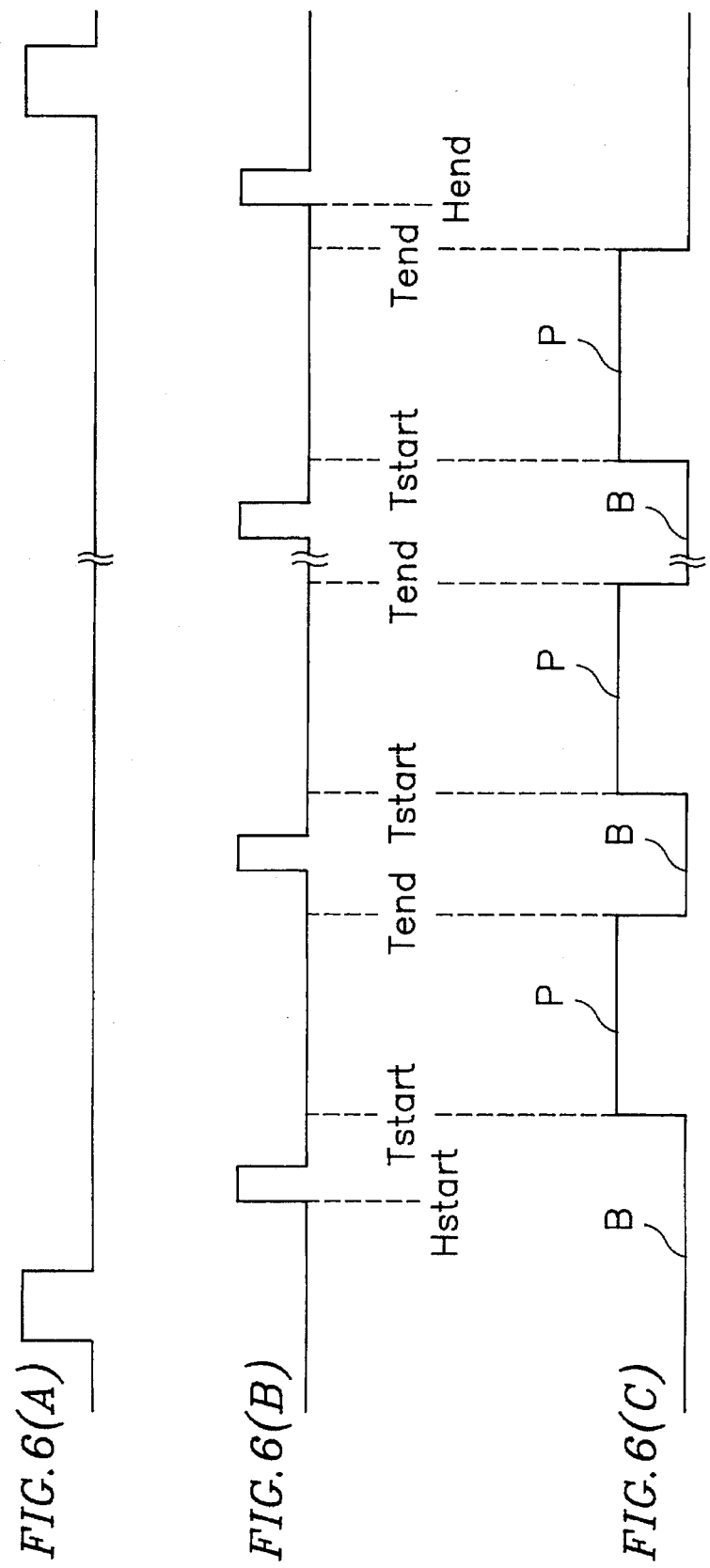
FIGS. 6A–6C offer an exemplary window signal generated from the control unit shown in FIG. 1.

In step 401, the control unit 70 begins to count the number of the horizontal sync signals, $H_n$, for each vertical sync signal as shown in FIG. 6A. And then, in steps 402 and 404, it is determined that the counted number $H_n$ is within or outside the range between the $H_{start}$ and $H_{end}$ by comparing it with each of the values $H_{start}$ and $H_{end}$. Thereafter, control goes to step 403 where the control unit 70 issues a first blank signal of a logic low level ("L") to the window generator 100 if the counted number $H_n$ is outside the range between the $H_{start}$ and $H_{end}$, whereas control flows to step 405 if the counted number $H_n$ is within the range between the $H_{start}$ and $H_{end}$.

In step 405, the control unit 70 begins to count the number of time intervals, $T_n$, for each horizontal sync signal as shown in FIG. 6B. And then, in steps 406 and 407, it is determined that the counted number $T_n$ is within or outside the range between the values Tstart and $T_{end}$ by comparing it with the values $T_{start}$ and $T_{end}$. Thereafter, the control unit 70 provides a second blank signal of the logic low level as in step 403 to the window generator 100 if the counted number $T_n$ is other than the values of the $T_{start}$ and the $T_{end}$. If the counted number $T_n$ is within the range between the values Tstart and $T_{end}$, control flows to step 408 where the control unit 70 issues a picture selection signal of a logic high level ("H") to the window generator 100. The first and the second blank signal are logically combined along with the picture selection signal to produce the window signal which alternates the blank signal section "B" and the picture selection section "P" as shown in FIG. 6C.

Figure 5:
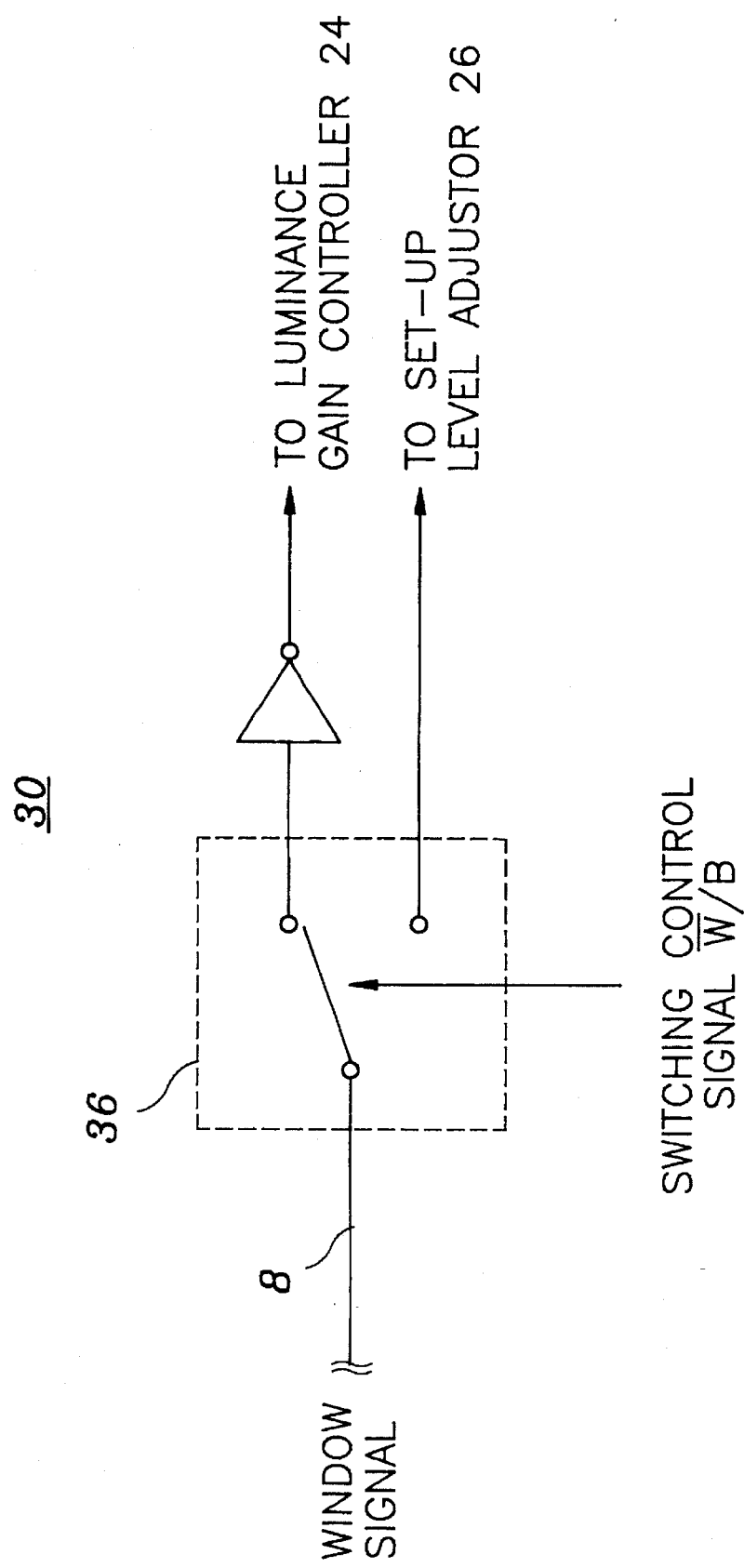
FIG. 5 describes the switch circuit shown in FIG. 1.

Referring back to FIG. 1, the window generator 100 is shown to include a color and luminance separator 10. The color and luminance separator 10 separates a color signal and a luminance signal from the video signal on line 2. The color signal is supplied to a color gain controller 22 and the luminance signal is supplied to a luminance gain controller 24 and then a set-up adjustor 26. The color gain controller 22 serves to control the color signal by varying the amplitude level thereof and the luminance gain controller 24 serves to control the luminance signal by varying the amplitude level thereof. The set-up adjustor 26 serves to control the luminance signal from the luminance gain controller by adjusting the so-called set-up level thereof. On the other hand, the window signal from the control unit 70 is applied through line 8 to the color gain controller 22 and a switch circuit 30. In response to the window signal, the color gain controller 22 controls the amplitude level to a lowest level so that the color component of the color signal is attenuated at each section B with a logic low level of the window signal. The switch circuit 30, as shown in FIG. 5, is switched by a white and black selection button 32 which provides a switching control signal ($\overline{W}/B$) to the switch circuit 30 and thereby selectively provides the window signal to the luminance gain controller 24 or the set-up adjustor 26. When the window signal is applied to the luminance gain controller 24 through the switch circuit 30, e.g., at the "off" state of the white and black selection button 32, the luminance gain controller 24 attenuates the amplitude level of the luminance signal to a lowest level at each section B of the window signal, whereby the blank area is blackened. However, if the window signal is provided to the set-up level adjustor 26 through the switch circuit 30, e.g., at the "on" state of the white and black selection button 32, the set-up level adjustor 26 increases the set-up level of the luminance signal to a highest level at each section B of the window signal, which results in a white makeup of the blank area.

Figure 2:
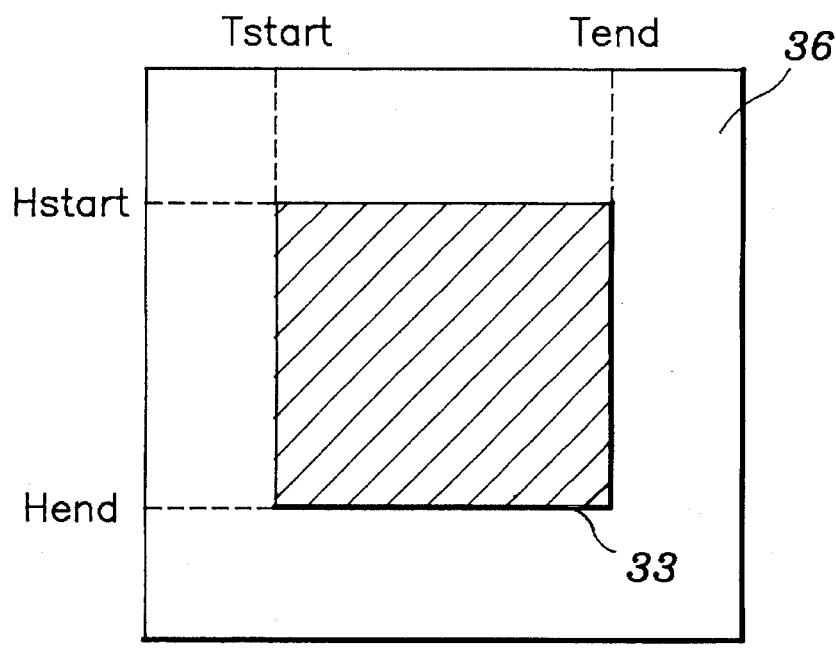
FIG. 2 shows exemplary patterns for the window and the blank area.

The horizontal and vertical synchronization signals from the sync signal generator 80 are also provided to a mixer circuit 40 in which the sync signals are mixed with the gain controlled luminance signal from the luminance gain controller 24 or the set-up adjusted luminance signal from the set-up adjustor 26. The output of the mixer circuit 40 and the gain controlled color signal from the color gain controller 22 are combined at an adder 45 which then provides a composite video signal to the viewfinder or the recording unit, resulting in the edited picture as shown in FIG. 2.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus for editing a picture by providing a window and a blank area within the picture for use in a video camera, generates a video signal for the picture with successive video lines, wherein the time taken to generate each video line is divided into a plurality of time intervals, said apparatus comprises:

means for generating a selection signal to select a vertical length and a horizontal width of the window;

means for generating vertical synchronization signals and horizontal synchronization signals for each video line;

control means, in response to the selection signal, for controlling the synchronization signals to generate a window signal; and a window generator, in response to the window signal, for processing the video signal to derive the window.

2. The apparatus of claim 1, wherein the selection signal generating means includes:

a first button for selecting a first value indicative of a top position of the vertical length of the window;

a second button for selecting a second value indicative of a bottom position of the vertical length of the window;

a third button for selecting a third value indicative of a left side position of the horizontal width of the window; and a fourth button for selecting a fourth value indicative of a right side position of the horizontal width of the window.

3. The apparatus of claim 2, wherein the control means includes:

a first counter for counting the number of the horizontal synchronization signals at each of the vertical synchronization signals;

a first comparator for comparing the counted number of the signals with the first and the second values;

a first determining means for determining if the counted number of the signals is within or outside the range between the first and the second values and for producing a first blank signal when the counted number is outside the range;

a second counter, when the counted number is the range between the first value and the second value, for counting the number of the time intervals at each of the horizontal synchronization signals;

a second comparator for comparing the counted number of the time intervals with the third and the fourth values;

a second determining means for determining if the counted number of the time intervals is within or outside the range between the third and the fourth values and for producing a second blank signal when the counted number of the time intervals is outside of the range, and for producing a picture selection signal when the counted number of the time intervals is within the range between the third and the fourth values;

means for combining the first and the second blank signals and the picture selection signal to produce the window signal.

4. The apparatus of claim 3, wherein the window generator includes:

a color and luminance separator for separating the video signal into a color signal and a luminance signal;

a color gain controller, in response to the window signal, for controlling the color level of the color signal from the separator;

a luminance gain controller, in response to the window signal, for controlling the luminance level of the luminance signal from the separator; and a level adjustor, in response to the window signal, for controlling the level of the luminance signal from the luminance gain controller.

5. The apparatus of claim 4, wherein the window generator further includes:

means for generating a switching control signal; and means, in response to the switching control signal, for selectively providing the window signal to the luminance gain controller or the level adjustor.

\* \* \* \* \*